(12) United States Patent
Chen et al.

(10) Patent No.: US 9,532,098 B2
(45) Date of Patent: Dec. 27, 2016

(54) METHOD, APPARATUS AND SYSTEM FOR CONTROLLING FOCUS ON TV INTERFACE

(71) Applicant: ZTE Corporation, Shenzhen, Guangdong (CN)

(72) Inventors: Jie Chen, Shenzhen (CN); Xingchang Zhu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/648,648

(22) PCT Filed: Jul. 19, 2013

(86) PCT No.: PCT/CN2013/079709
§ 371 (c)(1),
(2) Date: Jul. 7, 2015

(87) PCT Pub. No.: WO2013/167057
PCT Pub. Date: Nov. 14, 2013

(65) Prior Publication Data
US 2015/0312617 A1    Oct. 29, 2015

(30) Foreign Application Priority Data

Nov. 29, 2012  (CN) .......................... 2012 1 0499526

(51) Int. Cl.
*H04N 5/44*    (2011.01)
*H04N 21/422*  (2011.01)
(Continued)

(52) U.S. Cl.
CPC ...... *H04N 21/42204* (2013.01); *G06F 3/0383* (2013.01); *G06F 3/03547* (2013.01);
(Continued)

(58) Field of Classification Search
USPC ....... 348/734, 581, 576, 569, 376, 346, 345, 348/326, 158, 141, 838, 14.03; 345/157, 345/160, 161, 163, 169, 173, 666; 725/93, 725/100, 131; 715/711, 784, 799, 856
See application file for complete search history.

(56) References Cited

U.S. PATENT DOCUMENTS 6,921,336 B1 *  7/2005  Best .......................... A63F 13/10
                                                      463/32
9,024,894 B1 *  5/2015  Smith ................... G06F 3/0488
                                                      345/156
(Continued)

FOREIGN PATENT DOCUMENTS

CN      101980191 A      2/2011
CN      102096501 A      6/2011
(Continued)

OTHER PUBLICATIONS

Supplementary European Search Report in European application No. 13787683.5, mailed on Nov. 5, 2015.
(Continued)

*Primary Examiner* — Brian Yenke
*Assistant Examiner* — Mustafizur Rahman
(74) *Attorney, Agent, or Firm* — Oppedahl Patent Law Firm LLC

(57) ABSTRACT

Provided are a method, apparatus and system for controlling a focus on a television interface. The method includes that a remote control device generates a movement event and a corresponding movement path and notifies a TV controller, and the TV controller determines the location of a moved focus according to the movement event and the movement path. Through the technology for controlling a focus on a television interface, a button can be pressed for reduced (Continued)

times, the focus can be controlled in any direction conveniently, quickly and flexibly, and the user experience can be improved effectively.

12 Claims, 3 Drawing Sheets

(51) Int. Cl.
    *G06F 3/038* (2013.01)
    *G06F 3/0488* (2013.01)
    *G06F 3/0354* (2013.01)
    *G08C 17/02* (2006.01)
    *H04N 21/47* (2011.01)
    *G08C 23/04* (2006.01)

(52) U.S. Cl.
    CPC ......... *G06F 3/04883* (2013.01); *G08C 17/02* (2013.01); *G08C 23/04* (2013.01); *H04N 5/4403* (2013.01); *H04N 21/42222* (2013.01); *H04N 21/47* (2013.01); *G06F 2203/0384* (2013.01); *G08C 2201/32* (2013.01)

(56) References Cited

U.S. PATENT DOCUMENTS

| | | | |
|---|---|---|---|
| 2005/0078938 A1* | 4/2005 | Crohas | G11C 7/16 386/248 |
| 2007/0252721 A1* | 11/2007 | Geurts | G06F 3/0325 340/4.31 |
| 2009/0109183 A1* | 4/2009 | Carvajal | G06F 3/0416 345/173 |
| 2009/0254869 A1* | 10/2009 | Ludwig | G06F 3/038 715/863 |
| 2010/0070867 A1* | 3/2010 | Lemmers | G06F 21/36 715/735 |
| 2010/0113148 A1* | 5/2010 | Haltovsky | A63F 13/12 463/30 |
| 2010/0231525 A1 | 9/2010 | Chen | |
| 2010/0238109 A1* | 9/2010 | Cook | G06F 3/0346 345/156 |
| 2010/0277337 A1 | 11/2010 | Brodersen | |
| 2010/0321312 A1* | 12/2010 | Han | G06F 1/1694 345/173 |
| 2011/0154406 A1* | 6/2011 | Koo | H04N 5/44543 725/56 |
| 2011/0202934 A1* | 8/2011 | Ludwig | G06F 3/04815 719/328 |
| 2012/0044157 A1* | 2/2012 | Chen | G06F 3/038 345/173 |
| 2012/0050161 A1* | 3/2012 | Andersson | G06F 1/1626 345/158 |
| 2012/0056837 A1* | 3/2012 | Park | G06F 3/0414 345/173 |
| 2012/0195522 A1* | 8/2012 | Ludwig | G06F 3/0488 382/286 |
| 2012/0229398 A1* | 9/2012 | Zaliva | G06F 3/04883 345/173 |
| 2012/0229410 A1 | 9/2012 | Ohashi | |
| 2013/0002576 A1* | 1/2013 | Kim | G06F 3/017 345/173 |
| 2013/0038554 A1* | 2/2013 | West | G06F 3/0416 345/173 |
| 2013/0057765 A1* | 3/2013 | Zeleznikar | H04N 21/42207 348/570 |
| 2013/0065614 A1* | 3/2013 | Jung | H04M 1/72522 455/456.3 |
| 2013/0103797 A1* | 4/2013 | Park | H04L 65/60 709/217 |
| 2014/0237518 A1* | 8/2014 | Liu | B60N 2/4876 725/75 |
| 2014/0267933 A1* | 9/2014 | Young | H04N 21/42203 348/734 |
| 2014/0359467 A1 | 12/2014 | Brodersen et al. | |
| 2015/0003815 A1* | 1/2015 | Hill | H04N 21/42209 386/297 |

FOREIGN PATENT DOCUMENTS

| | | |
|---|---|---|
| CN | 202353685 U | 7/2012 |
| CN | 102984569 A | 3/2013 |
| EP | 2509335 A1 | 10/2012 |
| WO | 2012137697 A1 | 10/2012 |

OTHER PUBLICATIONS

International Search Report in international application No. PCT/CN2013/079709, mailed on Oct. 24, 2013.
English Translation of the Written Opinion of the International Search Authority in international application No. PCT/CN2013/079709, mailed on Oct. 24, 2013.

* cited by examiner

METHOD, APPARATUS AND SYSTEM FOR CONTROLLING FOCUS ON TV INTERFACE

TECHNICAL FIELD

The present disclosure relates to computer technology, in particular to a method, an apparatus and a system for controlling a focus on a TV interface.

BACKGROUND

When watching TV, a user can operate a remote control to implement interaction with the TV, such as entering a live broadcast interface, entering various functional interfaces and implementing all other TV functional operations. With the emergence of TV technology with enhanced interaction, such as an Internet Protocol Television (IPTV), the remote control becomes more important and also more complex. On a TV interface, it is necessary to operate the displayed content, and particularly when much content is contained on the interface, it is necessary to move a focus on a user interface in a simple and fast way.

However, the existing remote control controls the movement of a focus on an interface generally through a directional button, such as an Up, Down, Left or Right button of a remote control. When there are many elements on the TV interface, a user needs to press a button repeatedly for many times so as to move the focus to an expected interface element. Such an operation is tedious and inflexible.

SUMMARY

In view of this, the main objective of embodiments of the present disclosure is to provide a method, an apparatus and a system for controlling a focus on a TV interface, in order to control the focus conveniently, quickly and flexibly.

To this end, the technical solution of the embodiment of the present disclosure is implemented as follows:

A method for controlling a focus on a TV interface includes:

a remote control device generates a movement event and a movement path and notifies a TV controller of the movement event and the movement path; and the TV controller determines a location of a moved focus according to the movement event and the movement path, wherein the process that a remote control device generates a movement event and a corresponding movement path and notifies a TV controller of the movement event and the movement path may include: the remote control device captures the movement event and movement path, forms a movement event message according to the movement event and the movement path and sends the movement event message to the TV controller; and the process that the TV controller determines a location of a moved focus may include: the TV controller acquires a movement initial coordinate and the movement path from the movement event, and calculates the location of the moved focus according to the movement initial coordinate and the movement path.

The process of calculating the location of the moved focus may include:

when an interface control capable of holding a focus is on a TV interface located corresponding to a current movement location point, the TV controller controls the focus to move to the interface control.

The method may further include that:

when no interface control capable of holding the focus is on the TV interface located corresponding to the current movement location point, the TV controller controls the focus to move to the interface control which is nearest to the TV interface located corresponding to the current movement location point, or controls the focus to stay in place.

When the location of the moved focus is calculated, the following contents are further considered:

a movement speed of an object touching the remote control device to generate the movement event; and/or a sensitivity parameter of the remote control device.

An apparatus for controlling a focus on a TV interface includes a command receiving module, a command interpretation module and a command execution module, wherein the command receiving module is configured to receive a movement event and a movement path from a remote control device, and send the movement event and the movement path to the command interpretation module;

the command interpretation module is configured to determine a location of a moved focus according to the received movement event and the received movement path, and send the location of the moved focus to the command execution module; and the command execution module is configured to control a focus to move to the location of the moved focus.

When determining the location of the moved focus, the command interpretation module is configured to acquire a movement initial coordinate and the movement path according to the movement event and the movement path, and calculate the location of the moved focus according to the movement initial coordinate and the movement path.

When determining the location of the moved focus, the command interpretation module may be configured to:

when an interface control capable of holding the focus is on a TV interface located corresponding to a current movement location point, control the focus to move to the interface control.

When determining the location of the moved focus, the command interpretation module may be further configured to:

when no interface control capable of holding the focus is on a TV interface located corresponding to a current movement location point, control the focus to move to the interface control which is nearest to the TV interface located corresponding to the current movement location point, or control the focus to stay in place.

When determining the location of the moved focus, the command interpretation module may be further configured to consider following contents:

a movement speed of an object touching the remote control device to generate the movement event; and/or a sensitivity parameter of the remote control device.

The apparatus may be connected with a TV which is configured to display a movement process of the focus.

The apparatus may be a Set Top Box (STB), a smart TV or an enhanced TV device; and the remote control device may be a touchpad remote control, a mobile device with simulation remote control software, or an air mouse.

A system for controlling a focus on a TV interface includes a remote control device and a TV controller, wherein the remote control device is configured to generate a movement event and a movement path and notify the TV controller of the movement event and the movement path; and the TV controller is configured to determine a location of a moved focus according to the movement event and the movement path.

The remote control device may include a movement detection module and a command sending module, wherein the movement detection module is configured to generate a touch event according to a captured touch, and send the movement event and the corresponding movement path to the command sending module; and the command sending module is configured to send the movement event and the movement path to the TV controller.

The TV controller may include a command receiving module, a command interpretation module and a command execution module, wherein the command receiving module is configured to receive the movement event and the movement path from the remote control device, and send them to the command interpretation module;

the command interpretation module is configured to determine the location of the moved focus according to the received movement event and the received movement path, and send the location of the moved focus to the command execution module; and the command execution module is configured to control a focus to move to the location of the moved focus.

The TV controller may be an STB, a smart TV or an enhanced TV device; and the remote control device may be a touchpad remote control, a mobile device with simulation remote control software, or an air mouse.

Through the technology for controlling a focus on a TV interface in the embodiments of the present disclosure, the focus can be moved continuously and be moved in a more complex direction, for example, being moved slantways, without pressing a button repeatedly, so that the button is pressed for reduced times, the focus can be controlled in any direction conveniently, quickly and flexibly, and the user experience can be improved effectively.

DETAILED DESCRIPTION

Figure 1:
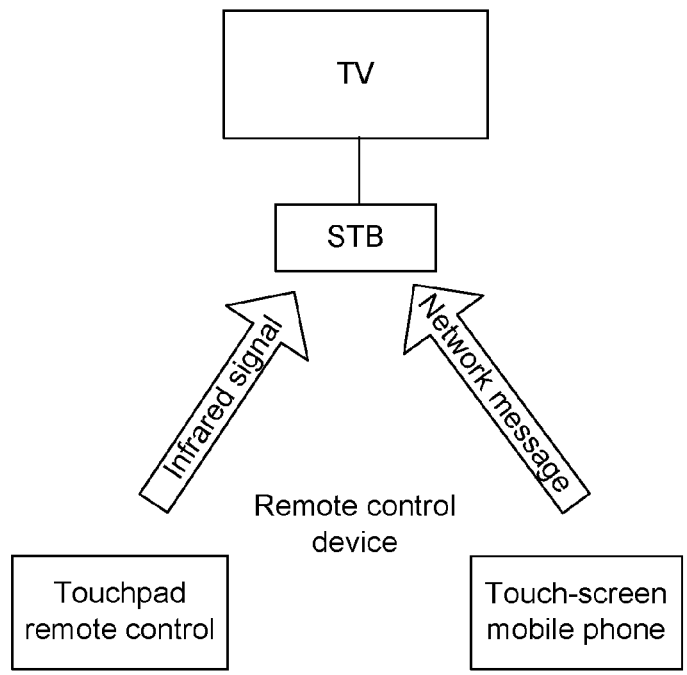
FIG. 1 is a diagram showing a deployment principle of an application environment in an embodiment of the present disclosure.

In an actual application, a remote control with a touchpad (hereafter called a touchpad remote control) can be used as a remote control device to control a focus on a TV interface. For example, a user can drag a finger on the touchpad remote control, the touchpad remote control captures the touch of the finger and generates a corresponding movement event (such as a touch event generated due to the touch) and a movement path, and a touch event message (such as touch start and touch movement) is formed according to the movement event and the movement path and is sent to an STB.

The STB acquires a movement initial coordinate (such as a touch initial coordinate generated due to the touch) and the movement path from the received touch event message, and calculates according to the movement initial coordinate and the movement path whether the focus needs to move and the location of the focus after being moved (or called a moved focus). For example, whether an interface control capable of holding the focus is on a TV interface located corresponding to the current movement location point (such as a touch point generated due to the touch) of the moved finger is calculated according to the touch initial point of the finger, the movement path and the current location of the focus. If the interface control capable of holding the focus is on the TV interface located corresponding to the current touch point, the STB controls the focus to move to the interface control; when no interface control capable of holding the focus is on the TV interface located corresponding to the current touch point, the STB can control the focus to move to the interface control which is nearest to the TV interface located corresponding to the current touch point or control the focus to stay in place.

The touch event message can further include the movement speed of the finger. Thus, the STB may take the movement speed of the finger into consideration when calculating the location of the focus, for example, more quickly the finger moves, more quickly the focus is moved.

In addition, the STB can also consider the sensitivity parameter of the touchpad when calculating the location of the focus. Thus, the STB may consider the sensitivity parameter when calculating the location of the focus, for example, the higher the sensitivity is, the higher the movement speed of the focus is.

It should be noted that, besides the touchpad remote control, other devices, such as a mobile device with simulation remote control software (such as a mobile phone and a tablet computer), can further control the location of the focus. These devices can be called a touch remote control which can control the focus on the TV interface according to touch (such as the touch on a touch screen or a touchpad by the finger or other objects).

In addition, besides the STB, other devices, such as a smart TV and an enhanced TV device, can specifically calculate and move the location of the focus. These devices are called TV controllers which can specifically implement control operations on the focus on the TV interface, such as calculating and moving, according to a message from the touch remote control or other signals.

The embodiments of the present disclosure will be described below in detail by the specific embodiments.

See FIG. 1, in a specific implementation environment shown in FIG. 1, a touch remote control as a remote control device can be a touchpad remote control or a touch-screen mobile phone; and the remote control device can also be an air mouse or other devices. The touch-screen mobile phone needs to install special remote control software. The touch-screen mobile phone and the touchpad remote control may send a corresponding instruction message to an STB, and the specific communication way may be various known wireless communication technology, such as infrared, Bluetooth, and a Wireless Fidelity (WIFI) network. In the embodiment, the touchpad remote control communicates with the STB through an infrared signal; and the remote control software on the touch-screen mobile phone communicates with the STB through the WIFI network.

Figure 2:
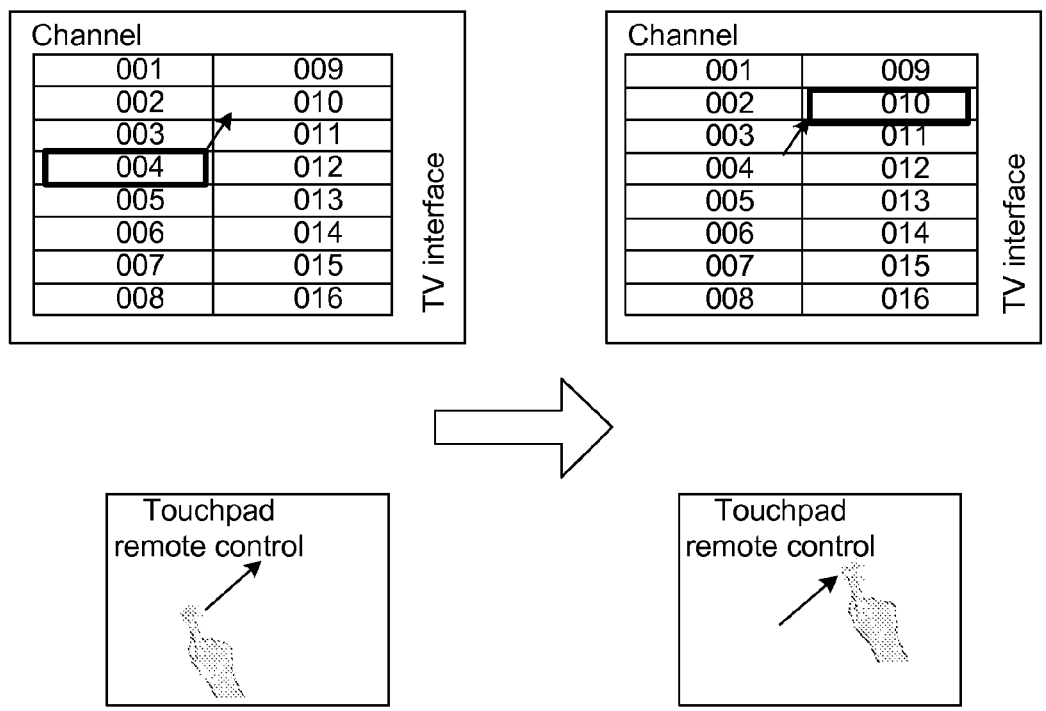
FIG. 2 is a diagram showing an effect of controlling a focus on a TV interface in an embodiment of the present disclosure.

See FIG. 2, in which a user slides on the touchpad of the touchpad remote control from the bottom left to the upper right with a finger, and correspondingly, a focus on the TV interface connected with the STB also moves to a new interface element on the upper right.

Figure 3:
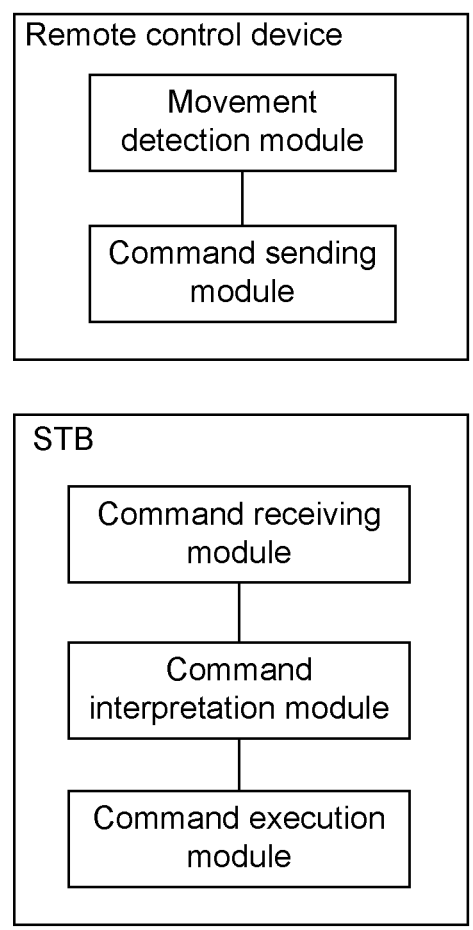
FIG. 3 is a diagram showing a structure of a system in an embodiment of the present disclosure.

See FIG. 3, as shown, the touchpad remote control may include a movement detection module (such as a touch detection module for detecting touch) and a command sending module, wherein the movement detection module may capture a finger operation of a user on the touchpad, acquire a location coordinate, movement path, movement speed and other information of the corresponding operation, and send the acquired information to the command sending module; and the command sending module encapsulates the received information into a touch event message and sends the message to an STB in a wireless communication way (or in a wired way in the actual application).

The STB may include a command receiving module, a command interpretation module and a command execution module, wherein the command receiving module can receive a touch event message from the touchpad remote control in a wireless communication way (or in a wired way in the actual application), and send the touch event message to the command interpretation module; and the command interpretation module calculates the received touch event message to obtain a location where the focus will move to, and sends the location to the command execution module which controls the focus to move to the location. Of course, the TV connected with the STB can display the moving process of the focus.

Figure 4:
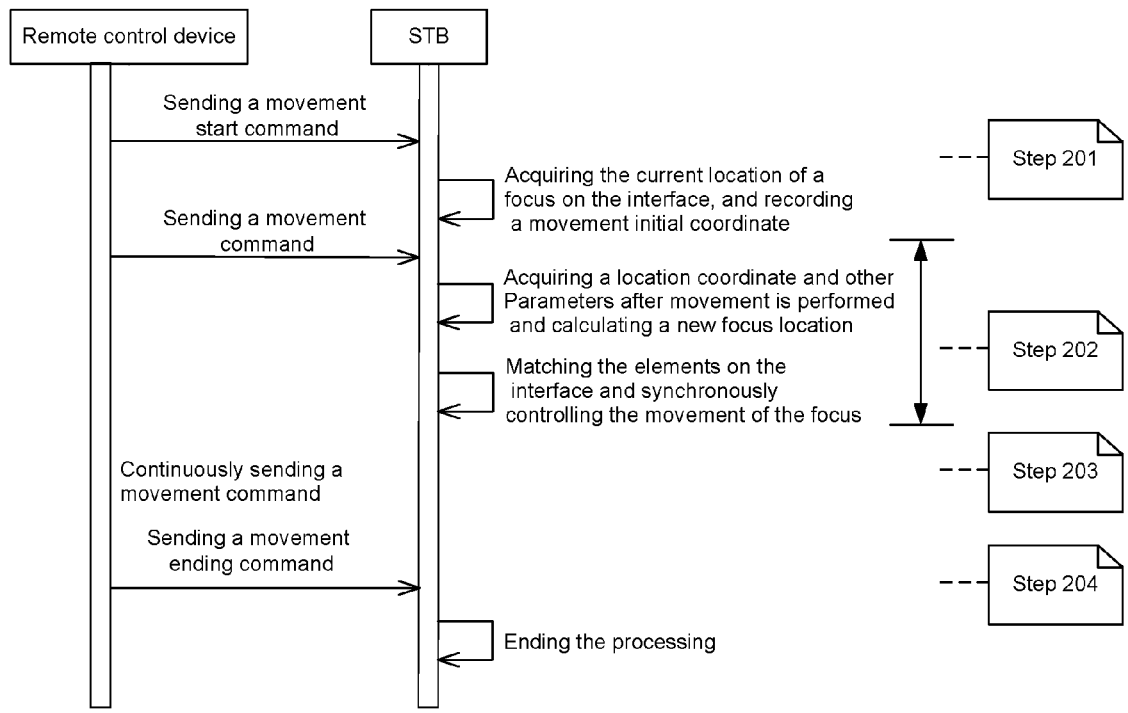
FIG. 4 is a diagram showing a flow of controlling a focus on a TV interface in an embodiment of the present disclosure.

When the operation principle of each device in FIG. 3 is represented by specific operation flow, as shown in FIG. 4, the flow shown here includes the following steps:

step 201: a user touches a touchpad on a touchpad remote control with a finger, and the touchpad captures the touch and generates a touch start event so as to send a touch start command to an STB; the STB receives the touch start command, acquires and records a touch initial coordinate value in the touch start command and a current location of a focus on a TV interface; in the embodiment, the touchpad remote control communicates with the STB through an infrared signal; correspondingly, the touchpad remote control includes an infrared signal transmission module, and the STB includes an infrared receiving module; the touchpad remote control sends a touch start message which includes an initial touch point coordinate value, such as (x1, y1); and the STB records the coordinate value of the current central location of the focus, such as (xa, ya);

step 202: the user slides with a finger on the touchpad of the touchpad remote control, and the touchpad captures the sliding operation and generates a touch movement event so as to send a touch movement command to the STB; the STB receives the touch movement command, and acquires a location coordinate value of the moved touch; the command interpretation module in the STB calculates the location value of the moved focus according to the location point of the moved touch, the touch initial location and the original location value of the focus; in the embodiment, when the coordinate value of the moved touch point is (x2, y2), the coordinate value (xa+x2−x1, ya+y2−y1) of the central location of the moved focus can be calculated according to the touch movement path and is recorded as (xb, yb);

the command execution module in the STB queries whether there is an element (such as an interface control) capable of holding the focus at the location of the moved focus on the interface; if there is such an element, the focus is held at the element; if not, the focus is held at an element which is nearest to the moved focus or the focus still stays in place; for example, the command execution module of the STB may query whether the point (xb, yb) is within the coordinate range of an element capable of holding the focus, if the point (xb, yb) is within the coordinate range, the focus is moved to the element, otherwise, the focus stays in place;

step 203: in an actual application, the operation in step 202 may be repeated, namely, when the user keeps sliding with the finger on the touch pad of the touchpad remote control, the touchpad generates a touch movement event in real time and sends a touch movement command to the STB continuously; the frequency of sending the touch movement command is configurable, and a higher sending frequency can ensure a smoother movement of the focus on the TV interface and obtain better user experience; and step 204: when the user moves the finger away from the touchpad of the touchpad remote control, the touchpad captures this action and generates a touch ending event so as to send a touch ending command to the STB; the STB receives the touch ending command, and ends the command interpretation and the movement of the focus.

In step 201, the communication between the touchpad remote control and the STB may be also implemented in other ways, such as Bluetooth. When a touch-screen mobile phone is adopted, the communication between the touch-screen mobile phone and the STB may be implemented based on a WIFI network and the like, and its signaling transmission protocol may be based on various self-defined Transmission Control Protocol (TCP), User Datagram Protocol (UDP), Hypertext Transfer Protocol (HTTP) or some existing application protocols, such as Universal Plug and Play (UPNP) protocols. Besides, before the remote control operation is performed by the touch-screen mobile phone, the remote control software in the touch-screen mobile phone needs to establish communication with the STB at first to establish a control relationship.

In step 202, the parameter of the touch movement speed may be added in the touch movement event, and the command interpretation module in the STB may consider the movement speed of an object on the touchpad when calculating the location of a moved focus. For example, the average touch movement speed value is carried in the touch movement event, if the horizontal movement speed is vx, and the vertical movement speed is vy, then the central location coordinate value of the moved focus calculated by the command interpretation module is (xa+(x2−x1)*vx, ya+(y2−y1)*vy).

In addition, a sensitivity parameter for touch and movement may be set in the STB, and the command interpretation module of the STB may also consider the sensitivity parameter when calculating the location of the moved focus. For example, if the sensitivity parameter is marked as c, then the central location coordinate value of the moved focus calculated by the command interpretation module is (xa+(x2−x1)*c, ya+(y2−y1)*c).

In step 202, the TV interface may be implemented by a web browser, thus, the command interpretation module and the command execution module may be arranged in the web browser; or, the TV interface may also be implemented by a local application, thus, the command interpretation module and the command execution module may be arranged in the STB and may be implemented by an STB operation system or an application.

Figure 5:
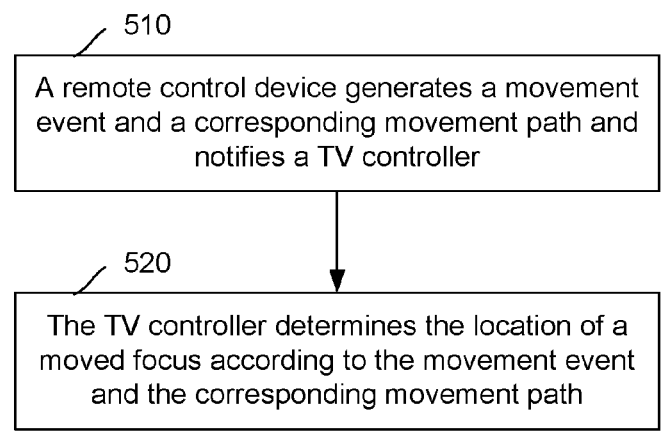
FIG. 5 is a schematic diagram showing the flow of controlling a focus on a TV interface in an embodiment of the present disclosure.

In combination with what described above, the operation of controlling a focus on the TV interface in the embodiment can be as shown in FIG. 5, the flow includes the following steps:

step 510: a remote control device generates a movement event and a corresponding movement path and notifies a TV controller; and Step 520: the TV controller determines the location of a moved focus according to the movement event and the corresponding movement path.

To sum up, through the technology for controlling a focus on a TV interface in the embodiments of the present disclosure, the focus can be moved continuously and be moved in a more complex direction, for example, being moved slantways, without pressing a button repeatedly, so that the button can be pressed for reduced times, the focus can be controlled in any direction conveniently, quickly and flexibly, and the user experience can be improved effectively. Moreover, the focus stays on the TV interface all the time.

The above are only the preferred embodiments of the present disclosure, and are not intended to limit the scope of protection of the claims of the present disclosure.

What is claimed is:

1. A method for controlling a focus on a Television (TV) interface, comprising:
    generating, by a touch remote control device, a movement event and a movement path and notifying a TV controller of the movement event and the movement path;
    determining, by the TV controller, a location of a moved focus according to the movement event and the movement path, wherein the focus determines which interface control is used for receiving information input by an input device, wherein the movement path and movement location of the focus is controlled by the touch remote control device,
    wherein the process of generating, by a touch remote control device, a movement event and a movement path and notifying a TV controller of the movement event and the movement path comprises: capturing, by the touch remote control device, the movement event and movement path, forming a movement event message according to the movement event and the movement path and sending the movement event message to the TV controller,
    wherein the process of determining, by the TV controller, a location of a moved focus comprises: acquiring, by the TV controller, a movement initial coordinate and the movement path from the movement event message, and calculating the location of the moved focus according to the movement initial coordinate and the movement path,
    wherein the process of calculating the location of the moved focus comprises:
    when no interface control capable of holding a focus is on a TV interface located corresponding to a current movement location point, controlling, by the TV controller, the focus to move to the interface control which is nearest to the TV interface located corresponding to the current movement location point, or controlling the focus to stay in place.

2. The method according to claim 1 when an interface control capable of holding a focus is on the TV interface located corresponding to the current movement location point, controlling, by the TV controller, the focus to move to the interface control.

3. The method according claim 2, wherein when the location of the moved focus is calculated, following contents are further considered:
    a movement speed of an object touching the touch remote control device to generate the movement event; and/or
    a sensitivity parameter of the touch remote control device.

4. The method according claim 1, wherein when the location of the moved focus is calculated, following contents are further considered:
    a movement speed of an object touching the touch remote control device to generate the movement event; and/or
    a sensitivity parameter of the touch remote control device.

5. An apparatus for controlling a focus on a Television (TV) interface, comprising a command receiving module, a command interpretation module and a command execution module, wherein
    the command receiving module is configured to receive a movement event and a movement path from a touch remote control device, and send the movement event and the movement path to the command interpretation module;
    the command interpretation module is configured to determine a location of a moved focus according to the movement event and the movement path, and send the location of the moved focus to the command execution module; and
    the command execution module is configured to control a focus to move to the location of the moved focus, wherein the focus determines which interface control is used for receiving information input by an input device, wherein the movement path and movement location of the focus is controlled by the touch remote control device,
    wherein when determining the location of the moved focus, the command interpretation module is configured to acquire a movement initial coordinate and the movement path according to the movement event and the movement path, and calculate the location of the moved focus according to the movement initial coordinate and the movement path,
    wherein when determining the location of the moved focus, the command interpretation module is configured to, when no interface control capable of holding a focus is on a TV interface located corresponding to a current movement location point, control the focus to move to the interface control which is nearest to the TV interface located corresponding to the current movement location point, or control the focus to stay in place.

6. The apparatus according to claim 5, wherein when determining the location of the moved focus, the command interpretation module is further configured to, when an interface control capable of holding the focus is on the TV interface located corresponding to the current movement location point, control the focus to move to the interface control.

7. The apparatus according to claim 5, wherein when determining the location of the moved focus, the command interpretation module is further configured to consider following contents:
    a movement speed of an object touching the touch remote control device to generate the movement event; and/or
    a sensitivity parameter of the touch remote control device.

8. The apparatus according to claim 5, wherein the apparatus is connected with a TV which is configured to display a movement process of the focus.

9. The apparatus according to claim 5, wherein the apparatus is a Set Top Box (STB), a smart TV or an enhanced TV device; and
the touch remote control device is a touchpad remote control, a mobile device with simulation remote control software, or an air mouse.

10. A system for controlling a focus on a Television (TV) interface, comprising a touch remote control device and a TV controller, wherein
the touch remote control device is configured to generate a movement event and a movement path and notify the TV controller of the movement event and the movement path; and
the TV controller is configured to determine a location of a moved focus according to the movement event and the movement path, wherein the focus determines which the interface control is used for receiving information input by an input device, wherein the movement path and movement location of the focus is controlled by the touch remote control device,
wherein the TV controller comprises a command receiving module, a command interpretation module and a command execution module, wherein
the command receiving module is configured to receive the movement event and the movement path from the touch remote control device, and send the movement event and the movement path to the command interpretation module;
the command interpretation module is configured to determine the location of the moved focus according to the movement event and the movement path, and send the location of the moved focus to the command execution module; and
the command execution module is configured to control a focus to move to the location of the moved focus,
wherein when determining the location of the moved focus, the command interpretation module is configured to acquire a movement initial coordinate and the movement path according to the movement event and the movement path, and calculate the location of the moved focus according to the movement initial coordinate and the movement path,
wherein when determining the location of the moved focus, the command interpretation module is configured to, when no interface control capable of holding a focus is on a TV interface located corresponding to a current movement location point, control the focus to move to the interface control which is nearest to the TV interface located corresponding to the current movement location point, or control the focus to stay in place.

11. The system according to claim 10, wherein the touch remote control device comprises a movement detection module and a command sending module, wherein
the movement detection module is configured to generate a touch event according to a captured touch, and send the movement event and the movement path to the command sending module; and
the command sending module is configured to send the movement event and the movement path to the TV controller.

12. The system according to claim 10, wherein
the TV controller is a Set Top Box (STB), a smart TV or an enhanced TV device; and
the touch remote control device is a touchpad remote control, a mobile device with simulation remote control software, or an air mouse.

* * * * *